(12) United States Patent
Humphreys et al.

(10) Patent No.: US 9,534,378 B2
(45) Date of Patent: Jan. 3, 2017

(54) PEEL AND STICK WATERPROOFING MATERIAL

(71) Applicant: TAMKO Building Products, Inc., Joplin, MO (US)

(72) Inventors: David C. Humphreys, Joplin, MO (US); Steven Russell, Joplin, MO (US); Michael Shifferd, Joplin, MO (US)

(73) Assignee: TAMKO Building Products, Inc., Joplin, MO (US)

( * ) Notice: Subject to any disclaimer, the term of this patent is extended or adjusted under 35 U.S.C. 154(b) by 0 days.

(21) Appl. No.: 14/645,497

(22) Filed: Mar. 12, 2015

(65) Prior Publication Data

US 2015/0259900 A1    Sep. 17, 2015

Related U.S. Application Data

(60) Provisional application No. 61/952,024, filed on Mar. 12, 2014.

(51) Int. Cl.
*E04B 1/66* (2006.01)
*B32B 37/16* (2006.01)
(Continued)

(52) U.S. Cl.
CPC .............. *E04B 1/665* (2013.01); *B32B 5/022* (2013.01); *B32B 5/26* (2013.01); *E04D 5/10* (2013.01); *E04D 12/002* (2013.01); *E04D 13/1675* (2013.01); *B32B 37/24* (2013.01); *B32B 38/10* (2013.01); *B32B 2255/02* (2013.01); *B32B 2255/10* (2013.01); *B32B 2255/24* (2013.01); *B32B 2262/0284* (2013.01);
(Continued)

(58) Field of Classification Search
CPC ............ E04B 1/665; B32B 5/022; B32B 5/26; B32B 2315/085; B32B 2255/02; B32B 2255/10; B32B 2255/24; B32B 2262/0284; B32B 2419/06; B32B 2307/7265; B32B 2307/748; B32B 2405/00; B32B 37/24; B32B 38/10; B32B 2307/5825; Y10T 428/141; Y10T 428/14; Y10T 156/1092
See application file for complete search history.

(56) References Cited

U.S. PATENT DOCUMENTS 5,106,557 A    4/1992    Rirsch et al.
5,822,943 A    10/1998   Frankoski et al.
(Continued)

FOREIGN PATENT DOCUMENTS

CA    2841988       1/2013
CN    101575896     5/2009
(Continued)

*Primary Examiner* — Patricia L Nordmeyer
(74) *Attorney, Agent, or Firm* — William W. Cochran; Cochran Freund & Young LLC

(57) ABSTRACT

Disclosed is waterproofing sheeting that uses a polyester layer that provides high lateral stability and puncture resistance. The waterproof sheeting can be used in many applications including waterproof roof underlayments, waterproof sheeting for foundations, underlayment for tile and flooring and various other applications. The waterproof sheeting can be manufactured without many of the problems associated with the granular coatings of existing waterproof sheeting that create excessive wear and environmental hazards.

7 Claims, 4 Drawing Sheets

(51) Int. Cl.
    *B32B 5/02*     (2006.01)
    *B32B 37/12*     (2006.01)
    *B32B 5/26*     (2006.01)
    *E04D 5/10*     (2006.01)
    *E04D 12/00*     (2006.01)
    *E04D 13/16*     (2006.01)
    *B32B 37/24*     (2006.01)
    *B32B 38/10*     (2006.01)
    *E04D 1/34*     (2006.01)

(52) U.S. Cl.
    CPC ............ *B32B 2307/5825* (2013.01); *B32B 2307/7265* (2013.01); *B32B 2307/748* (2013.01); *B32B 2315/085* (2013.01); *B32B 2405/00* (2013.01); *B32B 2419/06* (2013.01); *E04D 2001/3435* (2013.01); *Y10T 156/1092* (2015.01); *Y10T 428/141* (2015.01)

(56) References Cited

U.S. PATENT DOCUMENTS

| | | | |
|---|---|---|---|
| 6,479,117 B1 | 11/2002 | Phillips et al. | |
| 6,524,489 B1 | 2/2003 | Palm et al. | |
| 6,586,080 B1 | 7/2003 | Heifetz | |
| 6,641,896 B2 | 11/2003 | Fensel et al. | |
| 6,773,526 B2 | 8/2004 | Phillips et al. | |
| 6,924,015 B2 | 8/2005 | Zanchetta et al. | |
| 6,936,329 B2 | 8/2005 | Kiik et al. | |
| 7,132,143 B2 | 11/2006 | Zanchetta et al. | |
| 7,442,270 B2 | 10/2008 | Bartek | |
| 7,776,417 B2 | 8/2010 | Mohseen et al. | |
| 7,803,725 B2 | 9/2010 | Payne et al. | |
| 7,977,259 B2 | 7/2011 | Ratcliff et al. | |
| 8,394,730 B2 | 3/2013 | Grube et al. | |
| 2001/0051252 A1 | 12/2001 | Voyer et al. | |
| 2002/0037405 A1* | 3/2002 | Naipawer, III | B32B 7/12 428/351 |
| 2002/0066233 A1 | 6/2002 | McArdle et al. | |
| 2007/0065630 A1* | 3/2007 | Horne | B29C 70/202 428/105 |
| 2008/0248257 A1 | 10/2008 | Zanchetta et al. | |
| 2010/0104809 A1 | 4/2010 | Duda et al. | |
| 2010/0203336 A1 | 8/2010 | Shiao et al. | |
| 2010/0233408 A1 | 9/2010 | Zickell et al. | |
| 2011/0033685 A1 | 2/2011 | Folkersen | |
| 2011/0086201 A1 | 4/2011 | Shiao et al. | |
| 2011/0281094 A1 | 11/2011 | Zanchetta et al. | |
| 2012/0288678 A1 | 11/2012 | Grube et al. | |
| 2013/0065020 A1 | 3/2013 | Loftus et al. | |
| 2014/0044871 A1 | 2/2014 | Svec | |
| 2014/0072751 A1 | 3/2014 | Bradenburg | |
| 2014/0154448 A1 | 6/2014 | Engelhard | |
| 2014/0325929 A1 | 11/2014 | Vermilion et al. | |
| 2015/0044365 A1 | 2/2015 | Svec | |

FOREIGN PATENT DOCUMENTS

| | | | |
|---|---|---|---|
| CN | 103993707 | 6/2014 | |
| EP | 2674292 | 12/2013 | |
| GB | 1394997 A | * 5/1975 | ............ D06N 5/00 |
| JP | 07157960 A | * 6/1995 | |
| KR | 101397827 | 5/2014 | |
| WO | 2007081325 | 7/2007 | |

* cited by examiner

PEEL AND STICK WATERPROOFING MATERIAL

CROSS-REFERENCE TO RELATED APPLICATION

This application is based upon and claims priority to U.S. provisional application Ser. No. 61/952,024, filed Mar. 12, 2014, entitled "Peel and Stick Waterproofing Material," which application is specifically incorporated herein by reference for all that it discloses and teaches.

BACKGROUND

Peel and stick waterproofing sheets and mats have been used for various purposes in construction. For example, peel and stick sheets have been used on roofs and on foundations to protect against the seepage of water into houses and buildings. The peel and stick waterproof sheets are laid out on roofs and stick directly to the plywood, or other material, that forms the structural portion of the roof. Waterproofing sheets can also be applied directly to a foundation, such as a poured-in-place wall, or other foundation material, to protect against seepage of water into a basement or other area. In fact, there are many uses for waterproofing sheets which have a peel away layer that can be stuck directly to various surfaces that require waterproofing or for other purposes, such as structural stability, such as an underlayment for tile.

SUMMARY

An embodiment of the present invention may therefore comprise a self-adhesive protective sheet for attachment to a protected surface comprising: a polyester layer constructed from polyethylene terephthalate (PET) fibers that are bonded together to form a non-woven, liquid permeable PET sheet; an asphalt layer that is partially absorbed by the non-woven, liquid permeable PET sheet when asphalt, that forms the asphalt layer, is applied to the non-woven, liquid permeable PET sheet in a liquid state, so that a first side of the asphalt layer is bonded to the non-woven, liquid permeable PET sheet when the asphalt layer is in a solid state, the asphalt layer having a second side that has a tacky surface; a release film disposed on the second side of the asphalt layer that is secured to the tacky surface and can be peeled from the tacky surface so that the tacky surface can be attached to the protected surface.

An embodiment of the present invention may further comprise a method of making a self-adhesive protective sheet comprising: providing a polyester sheet that is constructed from polyethylene terephthalate (PET) fibers that are bonded together to form a non-woven, liquid permeable PET protective sheet; placing liquid asphalt on the non-woven, liquid permeable PET sheet that is partially absorbed by the non-woven, liquid permeable PET sheet; allowing the liquid asphalt to cool to form an asphalt layer that is bonded, on a first side of the asphalt layer, to the non-woven, liquid permeable PET sheet as a result of absorption of a portion of the liquid asphalt by the non-woven, liquid permeable PET sheet on the first side of the asphalt layer; placing a release film on a tacky second surface of the asphalt layer that can be peeled from the second tacky surface so that the second tacky surface can be applied to a surface to be protected.

An embodiment of the present invention may further comprise a self-adhesive protective sheet for attachment to a protected surface comprising: a polyester sheet constructed from polyethylene terephthalate fibers that are bonded together to form a non-woven, liquid permeable polyester sheet; a fiberglass layer; a first asphalt layer that is bonded, on a second side, to the fiberglass layer, and partially absorbed by the polyester sheet on a first side of the first asphalt layer, so that the first side of the asphalt layer is bonded to the polyester sheet; a second asphalt layer having a first side that is disposed on, and bonded to, the fiberglass layer, and a second side having a tacky surface; a release film disposed on a second side of the second asphalt layer that is secured to the tacky surface and that can be peeled from the tacky surface, so that the tacky surface can be attached to the protected surface.

An embodiment of the present invention may further comprise a method of making a self-adhesive protective sheet comprising: providing a first polyester sheet that is constructed from polyester fibers that are thermally bonded together to form a non-woven, liquid permeable layer of the self-adhesive protective sheet; providing a second polyester sheet that is constructed from polyester fibers that are thermally bonded together to form a non-woven, liquid permeable layer of the self-adhesive protective sheet; thermally bonding the first polyester sheet and the second polyester sheet to provide a polyester layer that is liquid permeable; placing asphalt on a fiberglass mesh that is partially absorbed by the fiberglass mesh; allowing the asphalt to cool to form a first asphalt layer that is bonded, on a second side of the first asphalt layer, to the fiberglass mesh as a result of absorption of a portion of the asphalt by the fiberglass mesh on the second side of the first asphalt layer; placing additional asphalt on the fiberglass mesh to form a second asphalt layer having a first side that is bonded to the fiberglass mesh and a second side having a tacky surface; placing the polyester layer on a first side of the first asphalt layer, so that the first side of the first asphalt layer is partially absorbed by the polyester layer to from a bond between the polyester layer and the first asphalt layer; placing a release film on the tacky surface of the second side of the second asphalt layer.

DETAILED DESCRIPTION OF THE EMBODIMENTS

Figure 1:
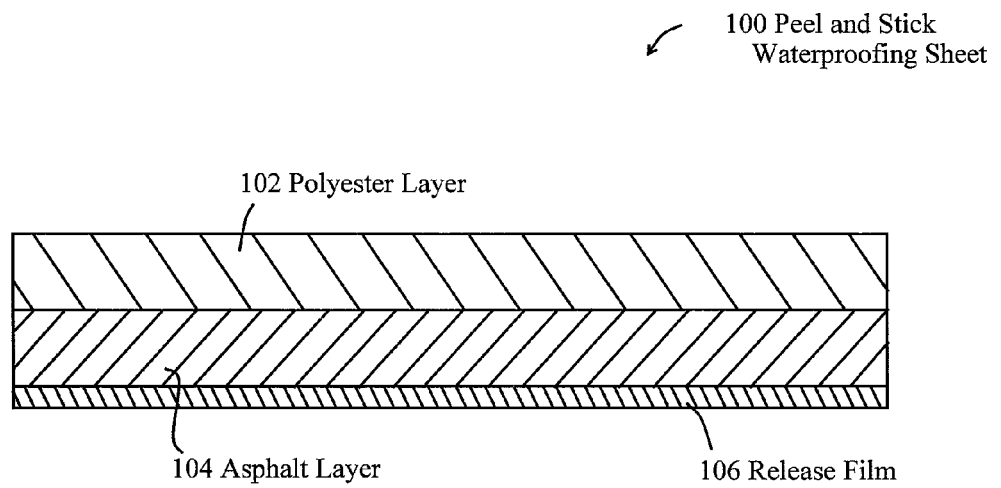
FIG. 1 is a side cutaway view of an embodiment of a peel and stick waterproofing sheet.

FIG. 1 is a cross-sectional side view of an embodiment of a peel and stick waterproofing sheet 100. As illustrated in FIG. 1, the waterproofing sheet 100 includes a polyester layer 102, which is attached to an asphalt layer 104. A release film 106 is connected to the exposed side of the asphalt layer 104. The polyester layer 102 provides a structural support for the asphalt layer 104. The polyester layer 102 has high tensile strength and lateral structural stability that maintains the asphalt layer 104 as a substantially uniform layer of asphalt across the surface of the polyester layer 102. The polyester layer 102 is semi-porous. During construction of the peel and stick waterproof sheet 100, asphalt is applied or pooled, on the polyester layer 102 at a sufficiently high temperature, so that the asphalt of the asphalt layer 104 is in a liquid state. A portion of the asphalt is absorbed by the polyester layer 102, so that a solid bond is formed between the asphalt layer 104 and the polyester layer 102. Additionally, the asphalt layer 104 is modified by the addition of certain polymers, so that the asphalt layer 104 maintains a tactile surface, which holds the release film 106 in place on the exposed surface of the asphalt layer 104. Release film 106 comprises a thin plastic sheet that adheres to the sticky surface of the exposed asphalt layer 104. The release film has a spray silicon or other release agent on its surface, in one embodiment, to help the release film in the process of being peeled from the asphalt layer. The release film 106 can be peeled away from the asphalt layer 104 to expose the surface of the asphalt layer 104. Once the release film 106 is removed, the asphalt layer 104 is sufficiently tacky to stick directly to the surface to be protected from water penetration or a surface to which tile is applied, or other surface.

In one embodiment, the polyester layer 102 is formed from polyethylene terephthalate (PET). The PET is provided in chips that are compressed and heated to form a PET liquid. The PET liquid is forced through a die that has a large number of small openings so that the liquid is extruded into fine threads. The threads are pulled and stretched to a proper diameter with an air venturi suction device. The threads are then laid out on a mesh to form a mat or sheet. Two of these mats or sheets are then joined together by heat fixing and, in some embodiments, the use of a binder. Some binding material may be a waterproof material. Otherwise, the asphalt layer 102 provides the waterproofing qualities of the waterproof sheet. The end result, of at least one embodiment, is a non-woven PET sheet that is liquid pervious and has high tensile strength resulting from the bonded polyester fibers. The polyester sheet is resistant to puncture, tearing and ripping. In addition, the polyester layer 102 is similar to a thick cloth that is pervious to liquids. In general, the polyester layer has a thickness of about 20 to 40 mils, although those thicknesses can be varied to obtain desired results.

In other known waterproof sheets, the exposed asphalt layer, i.e., the side of the asphalt layer that is not attached to a surface, is normally coated with a granular aggregate. Granular aggregate may comprise coal slag, silica sand, or other granular materials. The use of the granular materials prevents the asphalt layer in the prior art devices, from sticking to machinery during the manufacturing/assembly process. The granular materials that are coated on the exposed surface of the asphalt cause problems during the manufacturing process. For example, excessive wear can occur in the machinery that is used to assemble the waterproof sheet. Assembly machines must be constantly adjusted and repaired as a result of the use of abrasive materials as a granular material to mask the exposed layer of the asphalt so that the exposed layer is not sticky. Further, the coal slag, silica sand, or other granular materials, may generate dust that creates an environmental hazard and possible health problems. Consequently, the elimination of the granular materials is beneficial to the overall manufacturing process and the health and safety of workers.

The release film 106 may have a coating of silicon or other release agent to assist in the process of peeling away the release film 106 from the asphalt layer 104. As mentioned above, the asphalt layer 104 may be modified by mixing certain polymers with the asphalt layer 104, so that the asphalt layer 104 remains tacky after it cools. These polymers may comprise styrene-butadiene-styrene (SBS), styrene-isoprene-styrene (SIS), styrene-ethylene-butadiene-styrene (SEBS), or atactic-polypropylene (APP). Of course, other polymers may be used and other processes may be employed to maintain the tackiness of the asphalt layer 104 when the release film 106 is removed.

Because of the manner in which the polyester layer 102 is constructed from extruded threads of PET and other polyesters, the polyester layer 102 has high tensile strength and lateral stability, as well as a high degree of puncture resistance. The polyester layer 102 acts as a structural support for maintaining the asphalt layer 104 and prevents the asphalt layer 104 from being penetrated, ripped or pulled apart. As such, the peel and stick waterproofing sheet may be used as a roof underlayment, a floor underlayment, a tile underlayment and any application where strength and protection is needed, as well as waterproofing. In general, the thickness of the peel and stick waterproofing sheet 100 may range from approximately 30-60 mils, although that thickness may be varied for various applications. In one application, the waterproofing sheet 100 can be applied to a roof deck and roofing foam can be applied directly to the polyester layer 102. Because the polyester layer 102 is permeable, the roofing foam easily bonds to the polyester layer 102. Roofing tiles can then be placed on the roofing foam and secured in place by the foam. The roofing foam then holds the roofing tiles in place and the waterproofing sheet 100 provides a secure waterproof underlayment that has high strength and provides a high degree of protection. Good attachment is achieved between the foam and the polyester layer because some of the foam is absorbed in the very top portion of the polyester layer, which provides a strong attachment between the foam and the polyester layer 102.

In another application, the peel and stick waterproofing sheet 100 can be used below grade. For example, waterproofing sheet 100 can be attached directly to the foundation of a building, so that the asphalt layer 104 sticks directly on the foundation of the building with the polyester layer 102 providing puncture resistance, thereby eliminating and/or minimizing the need for additional protection materials to protect the waterproofing layer from puncture by rocks or other physical abrasion.

Figure 3:
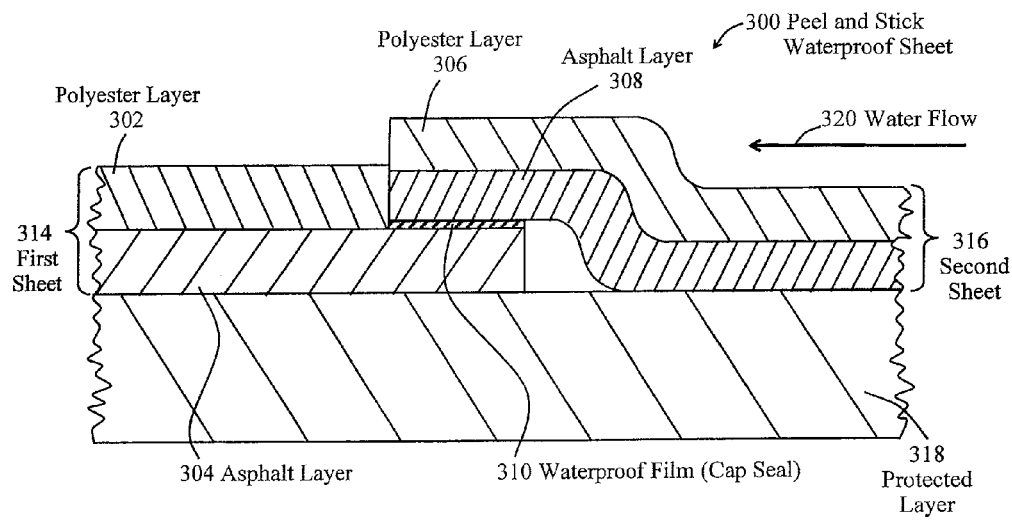
FIG. 3 is a side view illustrating the manner in which waterproofing sheets of the embodiment of FIG. 1 are overlapped.
Figure 4:
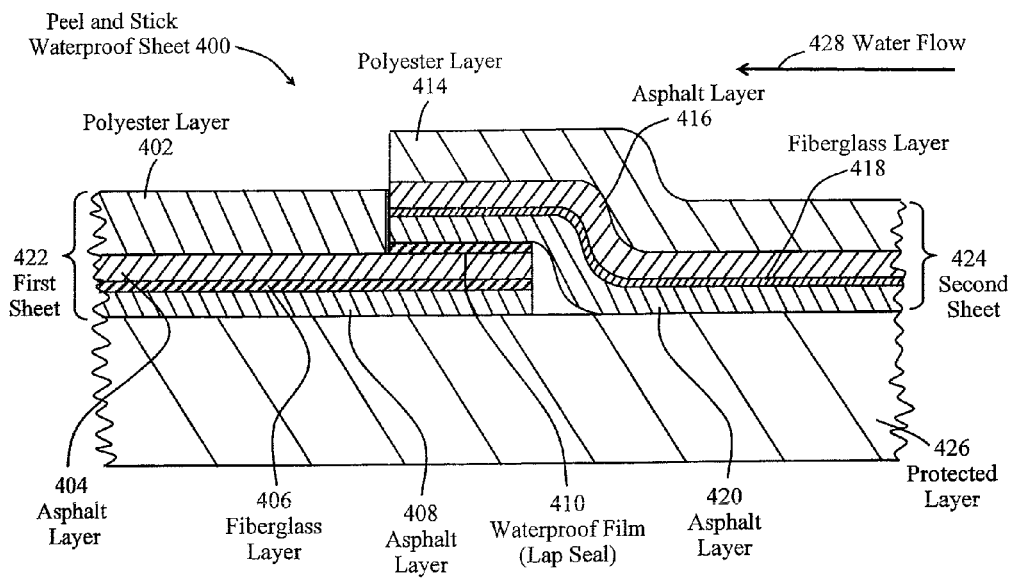
FIG. 4 is a side view illustrating the manner in which the waterproofing sheets of the embodiment of FIG. 2 are overlapped.

The width of the waterproofing sheet 100 may be any desired width. In one embodiment, the waterproofing sheet 100 is two meters wide and can be constructed in any desired length. As illustrated in FIGS. 3 and 4, multiple sheets can be used, such as an underlayment on a roof and overlapped, so that multiple courses of the waterproofing sheet 100 can be used to cover the entire deck of a roof.

Figure 2:
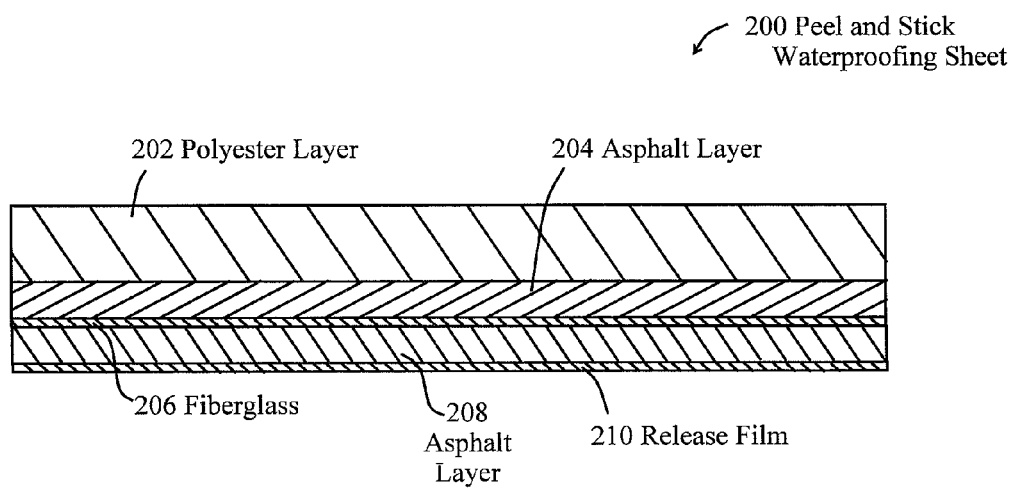
FIG. 2 is a side cutaway view of another embodiment of a peel and stick waterproofing sheet.

FIG. 2 illustrates another embodiment of a peel and stick waterproofing sheet 200. As illustrated in FIG. 2, a polyester layer 202 is disposed on a first surface of an asphalt layer 204. A fiberglass mesh 206 is disposed on a second surface of the first asphalt layer 204. A second asphalt layer 208 has a first side that is disposed on the fiberglass mesh 206. A second side of the asphalt layer 208 is covered by release film 210 in the same manner as disclosed above with respect to FIG. 1. The fiberglass mesh 206 provides additional structural stability for the asphalt layers 204, 208. The additional structural stability provided by the fiberglass mesh 206 supports the asphalt layers 204, 208 in areas where the asphalt layers 204, 208 are not connected to the polyester layer 202, as explained in more detail below with respect to FIGS. 3 and 4.

FIG. 3 is a cross-sectional view of two peel and stick waterproof layers that are overlapped and provide a waterproof seal. In the embodiment illustrated in FIG. 3, the first sheet 314 may comprise a lower layer of a course laid across a roof or a foundation, while the second sheet 316 is laid in a course across the roof above, or higher than, the first sheet 314. Sheet 314 includes a polyester layer 302 and an asphalt layer 304. The release layer has been removed and the asphalt layer 304 is adhered directly to the protected surface 318. For example, the protected surface 318 may comprise a roof deck with lower portions of the roof on the left side of FIG. 3 and higher portions on the right side of FIG. 3. The seam between the first sheet 314 and the second sheet 316 would run approximately horizontally across the roof deck. In the overlapping portions of the first sheet 314 and the second sheet 316, the polyester layer 302 is either removed or not formed on a portion of the asphalt layer 304. This portion of the exposed asphalt layer 304 is referred to as the selvage edge. A waterproof film 310 is laid across the exposed portion on top of the first side of the asphalt layer 304, which creates a waterproof barrier. The bottom, or second side, of the asphalt layer 308 of the second sheet 316, is placed over the waterproof film 310 to create a waterproof barrier between asphalt layer 308 and asphalt layer 304. The polyester layer 306 is raised above the level of the polyester layer 302. Water running down a roof, or down the side of a foundation, flows in the direction of arrow 320, from right to left, as illustrated in FIG. 3. In this manner, water is not pooled but flows over the overlapping layers.

FIG. 4 is a cross-sectional view of another embodiment of peel and stick waterproof sheets 422,424 that are overlapped. As illustrated in FIG. 4, the first sheet 422 includes a polyester layer 402 that is bonded to asphalt layer 404. Fiberglass layer 406 is bonded to both the asphalt layer 404 and asphalt layer 408. The fiberglass mesh layer 406 provides stability for the asphalt layers 404, 408 in the section where the polyester layer 402 is not connected to the asphalt layers 404, 408. This open portion, referred to as the selvage edge, includes a waterproof film 410 disposed on the top, or first surface, of the asphalt layer 404. The fiberglass mesh layer 406 provides stability and strength to the exposed selvage edge. The second sheet 424 has a polyester layer 414 that is bonded to the asphalt layer 416. Fiberglass mesh layer 418 is bonded to both the asphalt layer 416 and asphalt layer 420. The second, or lower side, of the asphalt layer 420, attaches to the waterproof film 410 and the protected surface 426, after removal of the releasable layer to provide a waterproof seal between the first sheet 422 and the second sheet 424. After removal of the release layer on first sheet 422, the second or lower surface of the asphalt layer 408 is secured to the protected surface 426, which may comprise a roof deck or a foundation surface. Similarly, the second or lower side of asphalt layer 420 is attached directly to the protected surface 426. Water runs over the sealed overlap area in the direction of arrow 428.

Figure 5:
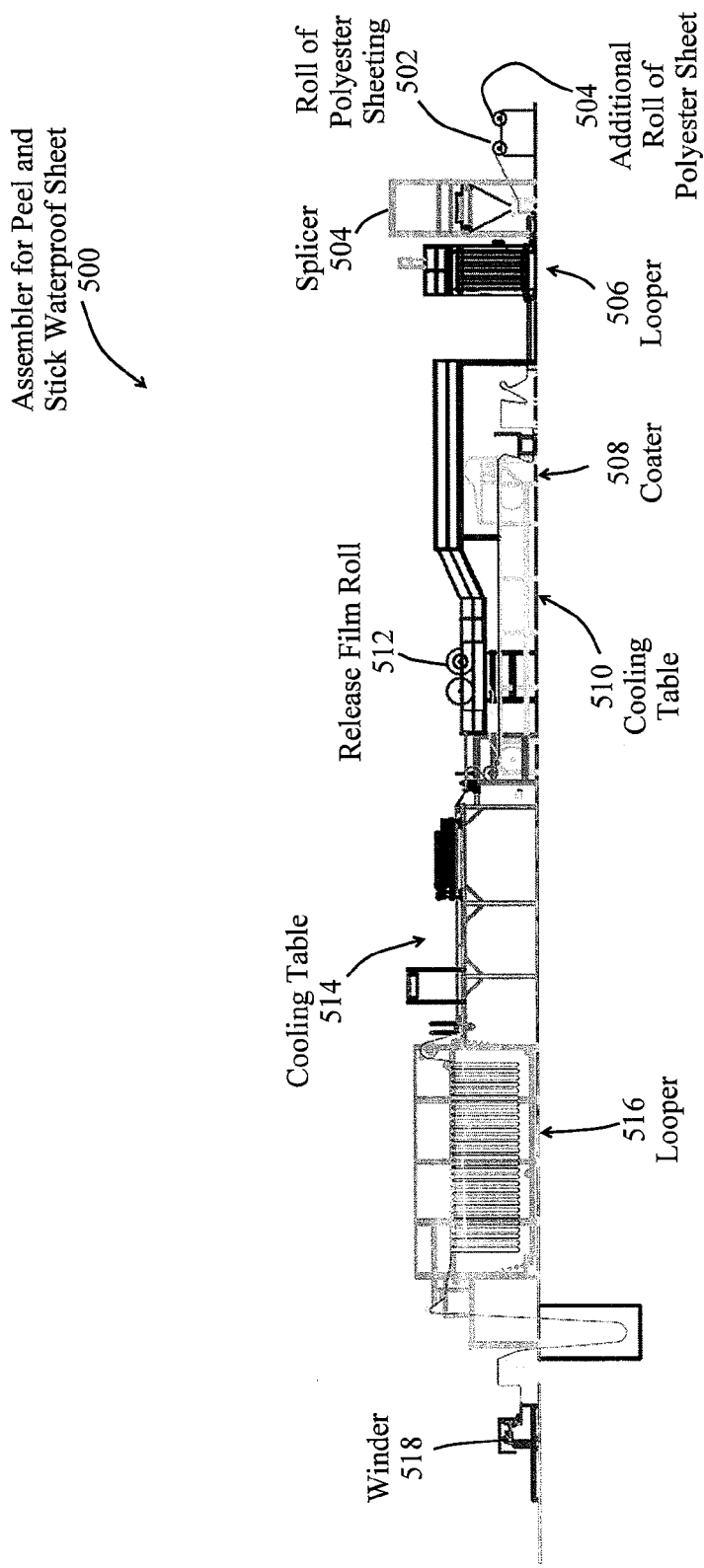
FIG. 5 is a side view of an embodiment of a device for assembling the waterproofing sheet of the embodiment of FIG. 1.

FIG. 5 is a side view of an assembler 500 for assembling the peel and stick waterproof sheet illustrated in FIG. 1. As shown in FIG. 5, a roll of polyester sheeting 502 is fed into a splicer 504. Splicer 504 functions to splice or join the end of the roll of polyester sheeting 502 to an additional roll of polyester sheeting 504 when the roll 502 ends. The empty roller is then removed and the additional roll 504 slides to the position of roll 502. Another additional roll can then be placed in the initial position of additional roll 504, as shown in FIG. 5. After the polyester sheeting leaves the splicer 504, it enters a looper 506, which allows the splicing operation to occur without stopping the assembler 500. The polyester sheet then moves to coater 508, which puddles asphalt on a top surface of the polyester sheeting in liquid form, so that the polyester sheeting is coated with an asphalt layer, such as asphalt layer 104 illustrated in FIG. 1. A metering roll controls the thickness of asphalt layer 104. The coated polyester sheet then moves over the cooling table 510 until the asphalt layer 104 is cooled to a solid state for application of a release film 106. Release film roll 512 is located over the asphalt layer disposed on the polyester sheeting. The sheeting then moves over the cooling table 514 until it cools sufficiently to enter the looper 516. The looper 516 provides sufficient time to allow the winder 518 to wind and cut the assembled waterproof sheeting.

Figure 6:
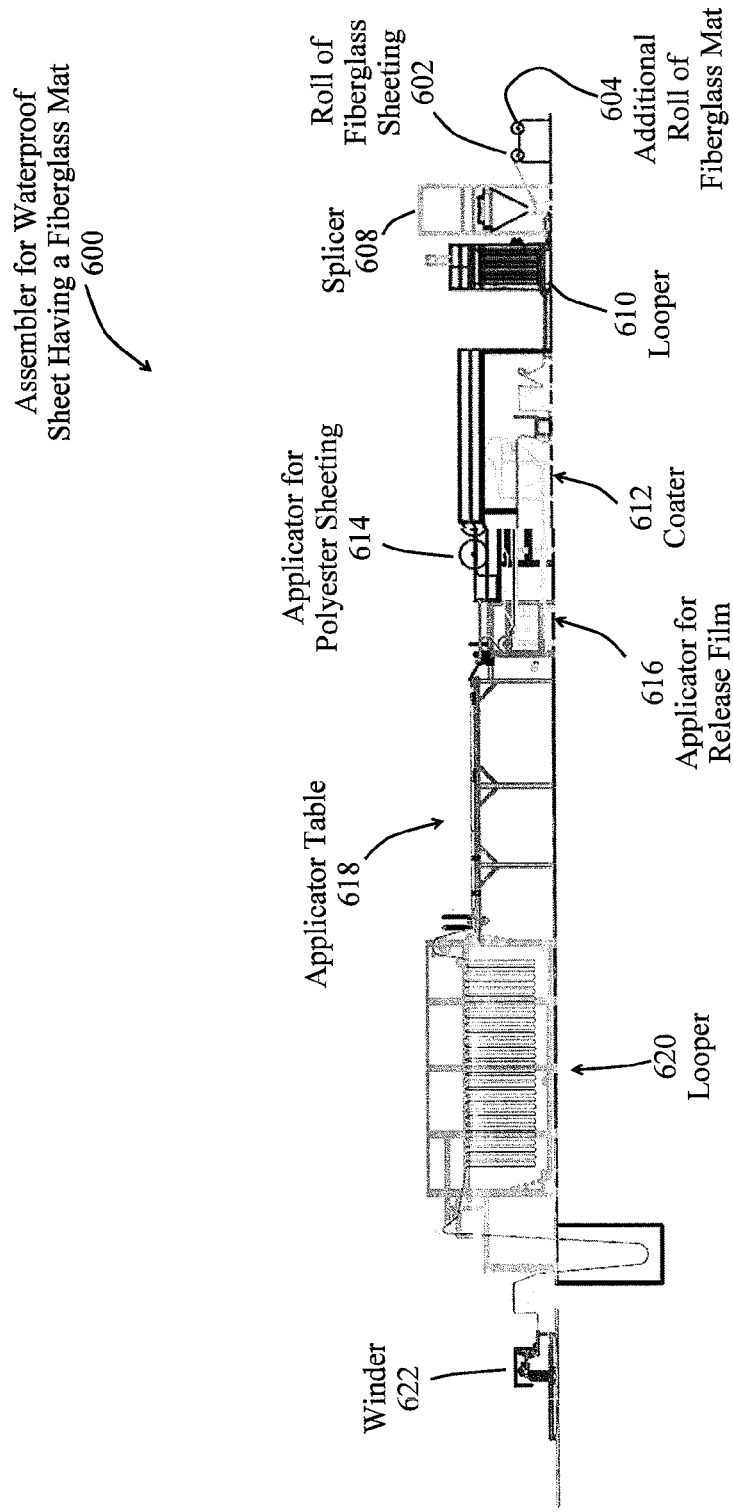
FIG. 6 is a side view of an embodiment of the device for assembling the waterproofing sheet of the embodiment of FIG. 2.

FIG. 6 is a side view of an assembler 600 for assembling the waterproof sheeting that is disclosed in FIG. 2. As illustrated in FIG. 6, a roll of fiberglass mesh 602 passes through the splicer 608. An additional roll of fiberglass mesh 604 is fed through the splicer 608 to splice the end of the roll 602 to the beginning of roll 604. Looper 610 provides sufficient time for the splicer 608 to form the splice without stopping the assembler 600. The fiberglass mesh then passes to coater 612. Coater 612 applies a first asphalt layer, such as asphalt layer 204, to the top surface of the fiberglass mesh. The asphalt is pooled on a top portion of the fiberglass sheeting and metered by a metering roller to achieve a proper thickness. The bottom surface of the fiberglass mesh is coated with asphalt by a wicking roll (not shown) which is partially submerged in a reservoir of asphalt. A scraper is then used to remove extra asphalt and to achieve a desired thickness of the bottom layer 208 of asphalt. The fiberglass mesh that is coated with a top layer, such as top layer 204, and a bottom layer, such as bottom layer 208, of asphalt then passes to the applicator for the polyester sheeting 614. The applicator 614 applies a polyester layer, such as polyester layer 202, to the top or first surface of asphalt layer 204. Applicator 616 applies the release film, such as release film 210, to the second or bottom surface of the asphalt layer 208. The assembled sheet then passes over a cooling section 616, which sprays water and air on the combined layers to evaporatively cool the sheet. to the looper 620. The looper 620 provides sufficient time for the winder 622 to wind and cut the sheet into rolls.

The present invention therefore provides waterproof sheeting that uses a polyester layer that provides high lateral stability and puncture resistance. The waterproof sheeting can be manufactured without the problems associated with granular coatings that create excessive wear to the assemblers and environmental hazards relating to dust created by the granular particles. The waterproof sheeting can be used in many applications, including waterproof roof underlayments, waterproof sheeting for foundations, underlayment for tile and flooring, and various other applications.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A self-adhesive protective sheet for attachment to a protected surface comprising:
    a first polyester layer constructed from polyethylene terephthalate (PET) fibers that are thermally bonded to each other to form a first sheet of non-woven, liquid permeable PET fibers that comprise said first polyester layer;
    second polyester layer constructed from polyethylene terephthalate (PET)fibers that are thermally bonded to each other to form a second sheet of non-woven, liquid permeable PET fibers that comprise said second polyester layer said first polyester layer thermally bonded to said second polyester layer to form a non-woven, liquid permeable, double thickness PET sheet that is resistant to puncture, tearing and ripping when exposed to environmental effects,
    an asphalt layer that is partially absorbed by said non-woven, liquid permeable, double thickness PET sheet when asphalt, that forms said asphalt layer, is applied to said non-woven, liquid permeable, double thickness PET sheet in a liquid state, so that a first side of said asphalt layer is bonded to said non-woven, liquid permeable, double thickness PET sheet when said asphalt layer is in a solid state, said asphalt layer having a second side that has a tacky surface;
    a release film disposed on said second side of said asphalt layer that is secured to said tacky surface and can be peeled from said tacky surface so that said tacky surface can be attached to said protected surface.

2. The self-adhesive protective sheet of claim 1 further comprising:
    a polymer mixed with said asphalt that causes said asphalt layer to remain tacky when said asphalt layer is in a solid state.

3. The self-adhesive protective sheet of claim 1 further comprising:
    a waterproof film disposed on an exposed portion of said first side of said asphalt layer that provides a waterproof seal when an adjacent self-adhesive protective sheet is disposed over said exposed portion of said first side of said asphalt layer.

4. The self-adhesive protective sheet of claim 1 further comprising:
    a bonding agent that bonds said polyester fibers.

5. A self-adhesive protective sheet for attachment to a protected surface comprising:
    a polyester sheet constructed from a first layer polyethylene terephthalate fibers that are thermally bonded to each other to form a first non-woven, liquid permeable polyester layer and a second layer of polyethylene terephthalate fibers that are thermally bonded to each other to form a second non-woven, liquid permeable polyester layer, said first layer and said second layer thermally bonded together to form a non-woven, liquid permeable, double thickness PET sheet that comprises said polyester sheet, and which is resistant to puncture, tearing and ripping when exposed to environmental effects;
    a fiberglass layer;
    a first asphalt layer that is bonded, on a second side, to said fiberglass layer, and partially absorbed by said polyester sheet on a first side of said first asphalt layer, so that said first side of said asphalt layer is bonded to said polyester sheet;
    a second asphalt layer having a first side that is disposed on, and bonded to, said fiberglass layer, and a second side having a tacky surface;
    a release film disposed on a second side of said second asphalt layer that is secured to said tacky surface and that can be peeled from said tacky surface, so that said tacky surface can be attached to said protected surface.

6. The self-adhesive protective sheet of claim 5 further comprising:
    a polymer mixed with said first asphalt layer and said second asphalt layer so that said first asphalt layer and said second asphalt layer remain tacky in a solid state.

7. The self-adhesive protective sheet of claim 6 wherein said polyester fibers are bonded together by applying heat to said polyester fibers.

* * * * *